Oct. 24, 1944. C. K. NEWCOMBE 2,360,969
SUPERCHARGER FOR INTERNAL-COMBUSTION ENGINES
Filed Jan. 3, 1942
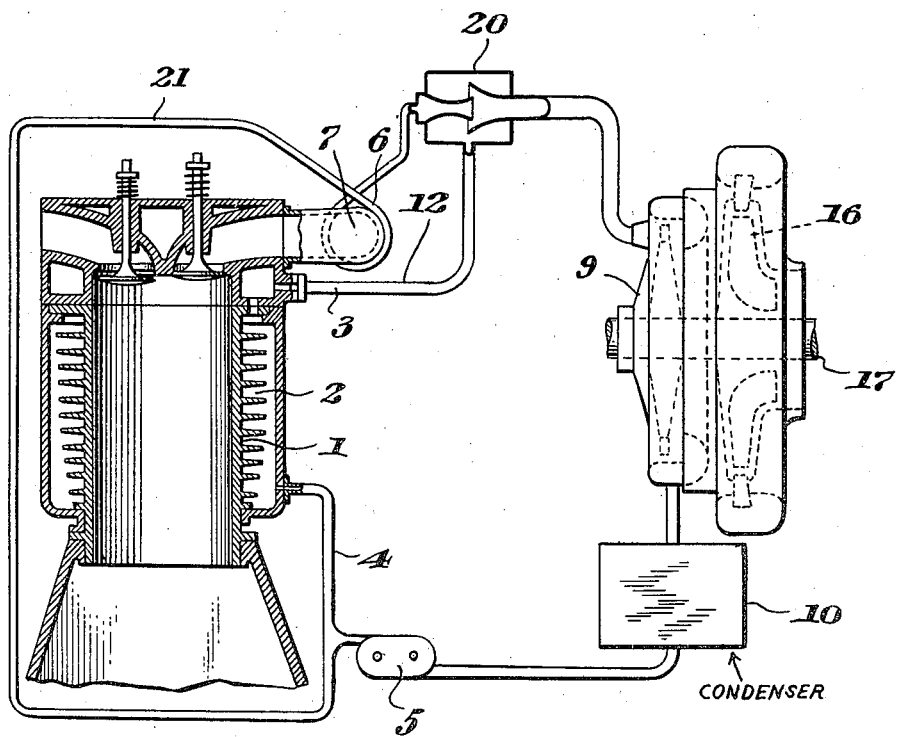
Inventor,
C. K. Newcombe
By Young Emery + Thompson
attys.

UNITED STATES PATENT OFFICE 2,360,969

SUPERCHARGER FOR INTERNAL-COMBUSTION ENGINES

Clare Kenzie Newcombe, Manchester, England, assignor to Heat Pumps Limited, London, England, a British company Application January 3, 1942, Serial No. 425,558
In Great Britain December 9, 1940

3 Claims. (Cl. 60—11)

This invention is for improvements in or relating to superchargers for internal-combustion engines, particularly aircraft engines.

It has already been proposed to drive an aircraft engine supercharger by means of a turbine fed with exhaust gases from the aircraft engine. With this method, there arises the disadvantage not only that the turbine is subjected to the corrosive effect of the exhaust gases, which in a modern aircraft engine reach high temperatures, but also that the back pressure in the exhaust system may adversely affect the running of the aircraft engine. In addition, the pressure of the gas in the turbine cannot be regulated, to any considerable extent, without affecting the performance of the engine. For the latter two reasons, it has not hitherto been possible to employ this known form of supercharger drive for an aircraft engine of the two-stroke type with any degree of success.

This invention is concerned with another known method of driving a turbine-operated supercharger of an internal-combustion engine in which pressure vapour developed at least in part by the liquid cooling system of the engine is supplied as the motive power for the turbine. In carrying out a method of this type, various proposals have been made; for example, it has been suggested that the liquid cooling system of the engine should be arranged to act as a preheater for a cooling liquid to be subsequently vaporized in an exhaust-gas heated boiler, the vapour being used to drive a turbine blower for the engine.

In carrying out the method of the above kind and according to the present invention an injector-type heat pump is employed for raising the temperature and pressure level of the vapour generated by the cooling system. Thus the invention provides, in an internal-combustion engine, the combination of a turbine-driven supercharger for the engine, an engine cooling system employed as the cooling medium, a liquid having the physical characteristics of the working fluid of a refrigerating plant, and an injector-type heat pump arranged to boost the temperature and pressure level of the vapour generated by the cooling system and to supply that vapour as motive power for driving the supercharger turbine.

Any of the fluid refrigerant media that are commonly employed in refrigerating apparatus comprising evaporative elements of the so-called flooded type may be employed as the cooling medium in the apparatus of the present invention, it being necessary to select a substance which, under operating conditions, will, on the one hand, maintain the engine cylinders below a selected temperature value and, on the other hand, will, by virtue of the heat absorbed from the engine, produce vapour under a pressure sufficient to provide the necessary energy for driving the turbine of the supercharger. The cooling medium is preferably one of the Freon group such as Freon 12 or dichloro-difluoro-methane which is non-toxic, has little or no action upon metal and can be useful for its fire-extinguishing properties in the event of a "crash." However, other known refrigerant liquids can also be employed, for example methyl bromide which, although it is toxic, has the advantage of high molecular weight and therefore enables the supercharger turbine to be of small dimensions, and also carbon tetrachloride.

One example according to the invention will now be described with reference to the accompanying diagram which indicates the general arrangement of the plant.

In this example each aircraft engine cylinder 1 is provided with a jacket 2 in the usual fashion employed for liquid-cooling systems, to provide a circulating space for the cooling liquid. The engine cylinder jacket 2 is provided at its upper part with an exit pipe 3 for the cooling medium, an inlet pipe 4 being located at the lower part thereof. The inlet pipe 4 feeds from a liquid circulating pump 5 of any suitable type. Preferably, the engine cylinder forms but a preheater for the cooling medium, a boiler proper being formed in the liquid outlet pipe by coiling a pipe 21 at 6 around the exhaust manifold 7. From the boiler, the mixture of liquid and vapour passes into a vapour injector type heat pump 20 from which vapour of energy content increased by said pump 20 is supplied to the turbine 9, the exhaust being passed into a condenser 10, e. g., of the radiator type, thence to the pump.

Conveniently, the turbine 9 and the supercharger impeller 16 are mounted on the same shaft 17.

The exhaust timing of the engine may be so altered that the major portion of the energy is contained in the exhaust gases; this energy would be transferred to the pressure vapour and the turbo-unit would develop the greater portion of the effective horse-power.

It will be seen that the exhaust-gas heated boiler is used to generate pressure vapour which in turn is utilized as the motive power of the injector-type heat pump 20 for raising the temperature level of the vapour generated by the cooling system. The purpose of this arrangement is to increase the heat drop available for the turbine by increasing the pressure of the cooling vapour.

I claim:

1. In an internal-combustion engine, the combination of a turbine-driven supercharger for the engine, an engine cooling system employing as the cooling medium a liquid having the physical characteristics of the working fluid of a refrigerating plant, an injector-type heat pump arranged to boost the temperature and pressure level of the vapour generated by the cooling system and to supply that vapour as motive power for driving the supercharger turbine, and an exhaust-gas heated boiler arranged to generate the pressure vapour used as motive power for the heat pump.

2. In an internal-combustion engine, the combination of a turbine-driven supercharger for the engine, an engine cooling system employing as the cooling medium a liquid having the physical characteristics of the working fluid of a refrigerating plant, an injector-type heat pump arranged to boost the temperature and pressure level of the vapour generated by the cooling system and to supply that vapour as motive power for driving the supercharger turbine, an exhaust-gas heated boiler arranged to generate the pressure vapour used as motive power for the heat pump, and a circulating pump for the cooling liquid.

3. In an internal-combustion engine, the combination of a turbine-driven supercharger for the engine, an engine cooling system employing as the cooling medium a liquid having the physical characteristics of the working fluid of a refrigerating plant, an injector-type heat pump arranged to boost the temperature and pressure level of the vapour generated by the cooling system and to supply that vapour as motive power for driving the supercharger turbine, an exhaust-gas heated boiler arranged to generate the pressure vapour used as motive power for the heat pump, a circulating pump for the cooling liquid, and a condenser to receive exhaust from the turbine and return the condensed liquid to the circulating pump.

CLARE KENZIE NEWCOMBE.